(12) United States Patent
Yu et al.

(10) Patent No.: US 8,068,122 B2
(45) Date of Patent: Nov. 29, 2011

(54) METHOD OF IMAGE SCALING

(75) Inventors: Zhilong Yu, Shenzhen (CN); Ruohong Zhu, Shenzhen (CN)

(73) Assignee: BYD Company, Ltd, Shenzhen (CN)

( * ) Notice: Subject to any disclaimer, the term of this patent is extended or adjusted under 35 U.S.C. 154(b) by 569 days.

(21) Appl. No.: 12/258,290

(22) Filed: Oct. 24, 2008

(65) Prior Publication Data

US 2009/0122084 A1 May 14, 2009

(30) Foreign Application Priority Data

Nov. 14, 2007 (CN) .......................... 2007 1 0165995

(51) Int. Cl.
*G09G 5/00* (2006.01)
(52) U.S. Cl. ........................................ 345/660; 345/667
(58) Field of Classification Search .................. 345/660, 345/667; 382/298
See application file for complete search history.

(56) References Cited

U.S. PATENT DOCUMENTS

| | | | | |
|---|---|---|---|---|
| 6,407,736 B1 * | 6/2002 | Regan | ........................... | 345/422 |
| 6,535,220 B2 * | 3/2003 | Deering et al. | ............... | 345/582 |
| 6,747,663 B2 * | 6/2004 | Oberoi et al. | ................. | 345/606 |
| 7,333,119 B1 * | 2/2008 | King et al. | ..................... | 345/611 |
| 7,372,471 B1 * | 5/2008 | Hutchins | ....................... | 345/611 |
| 7,573,485 B1 * | 8/2009 | King et al. | ..................... | 345/611 |
| 7,818,165 B2 * | 10/2010 | Carlgren et al. | ................... | 704/8 |
| 7,876,332 B1 * | 1/2011 | Donham et al. | ............... | 345/619 |
| 2002/0050979 A1 * | 5/2002 | Oberoi et al. | .................. | 345/157 |
| 2003/0076331 A1 * | 4/2003 | Deering | ........................ | 345/581 |
| 2004/0012611 A1 * | 1/2004 | Taneja et al. | .................. | 345/611 |

FOREIGN PATENT DOCUMENTS

| | | |
|---|---|---|
| CN | 1449184 A | 10/2003 |
| CN | 1988591 A | 6/2007 |
| JP | 10336653 A | 12/1998 |

* cited by examiner

*Primary Examiner* — M Good Johnson
(74) *Attorney, Agent, or Firm* — Morgan, Lewis & Bockius LLP

(57) ABSTRACT

A method of image scaling includes the steps of: determining the coordinates of a virtual pixel in an original image, wherein the virtual pixel corresponds to an actual pixel in a scaled image; determining the coordinates of four actual pixels in the original image that are closest to the virtual pixel; determining the weights of the four actual pixels; and determining the pixel value of the virtual pixel in the original image in accordance with the determined weights and the pixel values of the four actual pixels.

13 Claims, 3 Drawing Sheets

METHOD OF IMAGE SCALING

CROSS-REFERENCE TO RELATED APPLICATION

This application claims priority to and benefit of Chinese Patent Application Serial No. 200710165995.7, filed in the State Intellectual Property Office of the P.R. China on Nov. 14, 2007, the entire contents of which are incorporated herein by reference.

FIELD OF THE INVENTION

The present invention relates to image processing, and in particular to a method of image scaling.

BACKGROUND OF THE INVENTION

With the development of technology, image processing is more and more widely used. Image scaling is an important part of the image processing. Image scaling requires that images be resized at a continuous ratio. The conventional method of image scaling is to calculate an image from its coordinate origin point by point, from left to right, and row after row, and so as to calculate the scaling result of the full image. In the scaling process, the conventional image scaling method often uses a product of the natural coordinates and numerator of a scale factor as the basis of weight calculation, which is computationally expensive and difficult to implement.

SUMMARY OF THE INVENTION

The present invention provides a method of image scaling to scale the size of an image efficiently. The method of image scaling includes the steps of: determining the coordinates of a virtual pixel in an original image, wherein the virtual pixel corresponds to an actual pixel in a scaled image; determining the coordinates of four actual pixels in the original image that are closest to the virtual pixel; determining the weights of the four actual pixels; and determining the pixel value of the virtual pixel in the original image in accordance with the determined weights and the pixel values of the four actual pixels.

In some embodiments, the step of determining the coordinates of the virtual pixel uses a scale factor n/m to divide the coordinates of the actual pixel in the scaled image. The step of determining the coordinates of the four actual pixels in the original image that are closest to the virtual pixel further includes steps of: rounding off the coordinates of the virtual pixel in the original image to determine the first actual pixel's coordinates (p, q), determining the second actual pixel's coordinates (p+1, q) by increasing the x-coordinate of the first actual pixel by one unit, determining the third actual pixel's coordinates (p, q+1) by increasing the y-coordinate of the first actual pixel by one unit, and determining the fourth actual pixel's coordinates (p+1, q+1) by increasing both the x-coordinate and y-coordinate of the first actual pixel by one unit.

The step of determining the weights of the four actual pixels further includes steps of: determining respectively the horizontal residual and the vertical residual of the first, second, third, and fourth actual pixels; determining the horizontal weights in accordance with the horizontal residuals of each of the four actual pixels, and determining the vertical weights in accordance with the vertical residuals of each of the four actual pixels.

The step of determining the pixel value of the virtual pixel in the original image further includes the steps of: determining the pixel value of a first temporary virtual pixel by averaging the pixel values of the first actual pixel and the second actual pixel in accordance with their respective horizontal weights; determining the pixel value of a second temporary virtual pixel by averaging the pixel values of the third actual pixel and the fourth actual pixel in accordance with their respective horizontal weights; and determining the pixel value of the virtual pixel by averaging the pixel values of the first temporary virtual pixel and the second temporary virtual pixel in accordance with the four actual pixel's respective vertical weights.

The step of determining the horizontal residual of an actual pixel in the original image further includes: assigning the horizontal residual $a_1$ of the first actual pixel to be zero; if the horizontal residual $a_N$ of the $N^{th}$ actual pixel is greater than or equal to n, the horizontal residual $a_{N-1}$ of the $(N+1)^{th}$ actual pixel is set to be $(a_N-n)$; and if the horizontal residual $a_N$ of the $N^{th}$ actual pixel is less than n, the horizontal residual $a_{N+1}$ of the $(N+1)^{th}$ actual pixel is set to be $(a_N+m-n)$.

The step of determining the vertical residual of an actual pixel in the original image further includes: assigning the vertical residual $b_1$ of the first actual pixel to be zero; if the vertical residual $b_N$ of the $N^{th}$ actual pixel is greater than or equal to n, the vertical residual $b_{N+1}$ of the $(N+1)^{th}$ actual pixel is set to be $(b_{N+1}-n)$; and if the vertical residual $b_N$ of the $N^{th}$ actual pixel is less than n, the vertical residual $b_{N+1}$ of the $(N+1)^{th}$ actual pixel is set to be $(b_N+m-n)$.

The step of determining the horizontal weight of an $N^{th}$ actual pixel in the original image further includes: if the horizontal residual $a_N \geq n$, the $N^{th}$ actual pixel is defined to be a minor contributory pixel; if the horizontal residual $a_N < n$, the $N^{th}$ actual pixel is defined to be a major contributory pixel and its major horizontal weight is set to be $(n-a_N)$; and if the horizontal residual $a_N < n$, the $(N+1)^{th}$ actual pixel is defined to be a minor contributory pixel and its minor horizontal weight is set to be $a_N$.

The step of determining the vertical weight of an $N^{th}$ actual pixel in the original image further includes: if the vertical residual $b_N \geq n$, the $N^{th}$ actual pixel is defined to be a minor contributory pixel; if the vertical residual $b_N < n$, the $N^{th}$ actual pixel is defined to be a major contributory pixel and its major vertical weight is set to be $(n-b_N)$; and if the vertical residual $b_N < n$, the $(N+1)^{th}$ actual pixel is defined to be a minor contributory pixel and its minor horizontal weight is set to be $b_N$.

The step of determining the pixel value of the first temporary virtual pixel further includes: weighting the pixel value of the first actual pixel in accordance with the horizontal weight of the first actual pixel's major horizontal contributory pixel; weighting the pixel value of the second actual pixel in accordance with the horizontal weight of the second actual pixel's minor horizontal contributory pixel; and determining the pixel value of the first temporary virtual pixel in accordance with the weighted pixel values of the first actual pixel and the second actual pixel.

The step of determining the pixel value of the second temporary virtual pixel further includes: weighting the pixel value of the third actual pixel in accordance with the horizontal weight of the third actual pixel's major horizontal contributory pixel; weighting the pixel value of the fourth actual pixel in accordance with the horizontal weight of the fourth actual pixel's minor horizontal contributory pixel; and determining the pixel value of the second temporary virtual pixel in accordance with the weighted pixel values of the third actual pixel and the fourth actual pixel.

The step of determining the pixel value of the virtual pixel in the original image further includes: weighting the pixel value of the first temporary virtual pixel in accordance with the vertical weight of the first actual pixel's major contributory pixel; weighting the pixel value of the second temporary virtual pixel in accordance with the vertical weight of the third actual pixel's minor contributory pixel; and determining the pixel value of the virtual pixel in accordance with the weighted pixel values of the first temporary virtual pixel and the second temporary virtual pixel.

In some embodiments, the numerator n of the scale factor n/m is a power of 2.

In some embodiments, the method of image scaling determines the pixel value of a virtual pixel through defining the horizontal and vertical residuals of actual pixels, determining the horizontal and vertical weights according to the defined horizontal and vertical residuals, and weighting the pixel values of the four actual pixels surrounding the virtual pixel in the original image to determine the pixel value of the corresponding actual pixel in the scaled image.

DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF THE EMBODIMENTS

Figure 1:
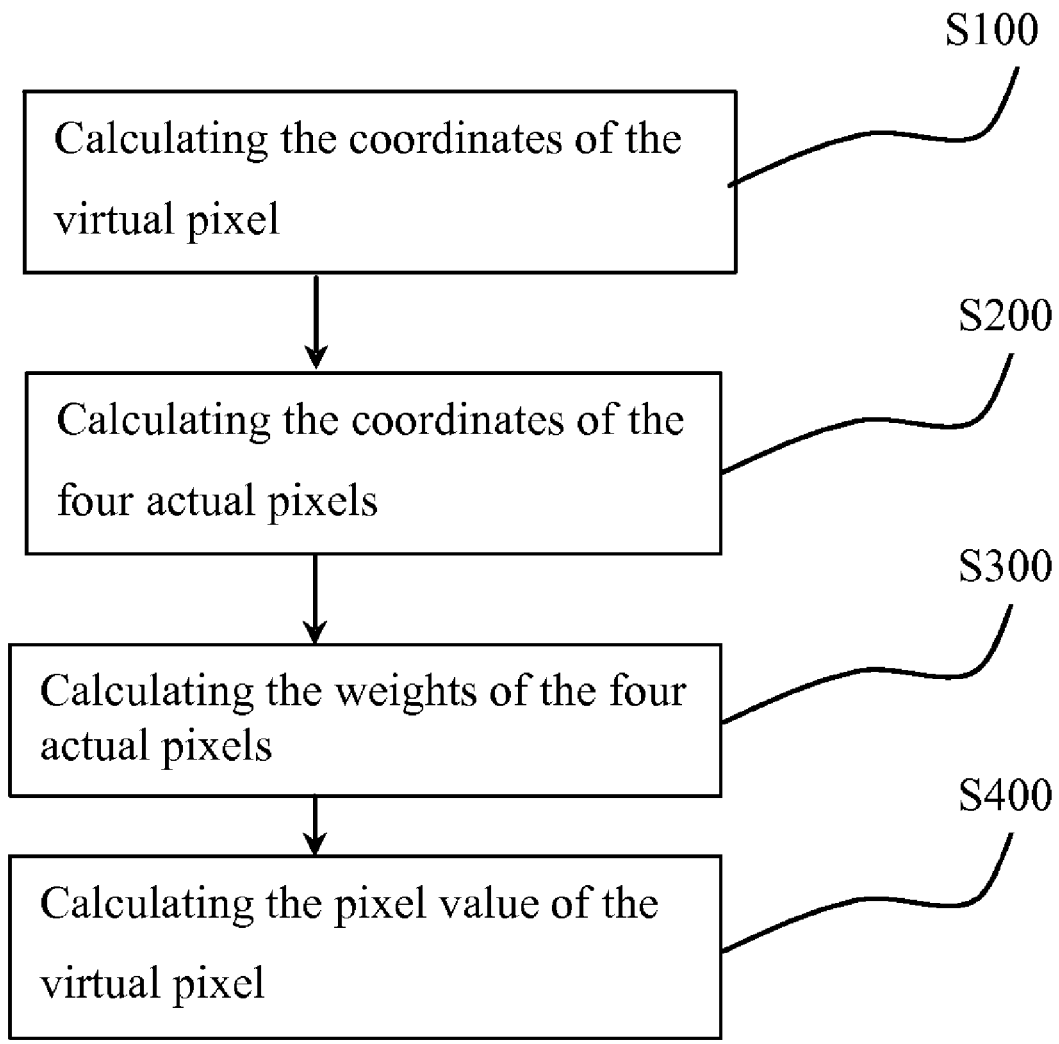
FIG. 1 is a flow chart illustrating one embodiment of the invention.

As shown in FIG. 1, the first embodiment of the present invention provides a method of image scaling. In the present invention, the image to be transformed is referred to as "original image" and the image after transformation is called "target image." To determine the pixel value of an actual pixel in the target image, a corresponding virtual pixel in the original image is defined. The coordinates of the virtual pixel in the original image is determined by transforming the coordinates of the actual pixel from the domain of the target image to the domain of the original image. The pixel value of the virtual pixel in the original image is determined by processing the pixel values of the actual pixels in the original image. The image scaling process begins with the coordinate origin of the original image and performs the calculation row by row and pixel by pixel within a row until the scaling result of the full image is completed.

The method of image scaling according to some embodiments of the present embodiment includes:

Step S100: Determine the coordinates of a virtual pixel in an original image, wherein the virtual pixel corresponds to an actual pixel in a scaled image;

Step S200: Determine the coordinates of four actual pixels in the original image that are closest to the virtual pixel;

Step S300: Determine the weights of the four actual pixels; and

Step S400: Determine the pixel value of the virtual pixel in the original image in accordance with the determined weights and the pixel values of the four actual pixels.

Figure 2:
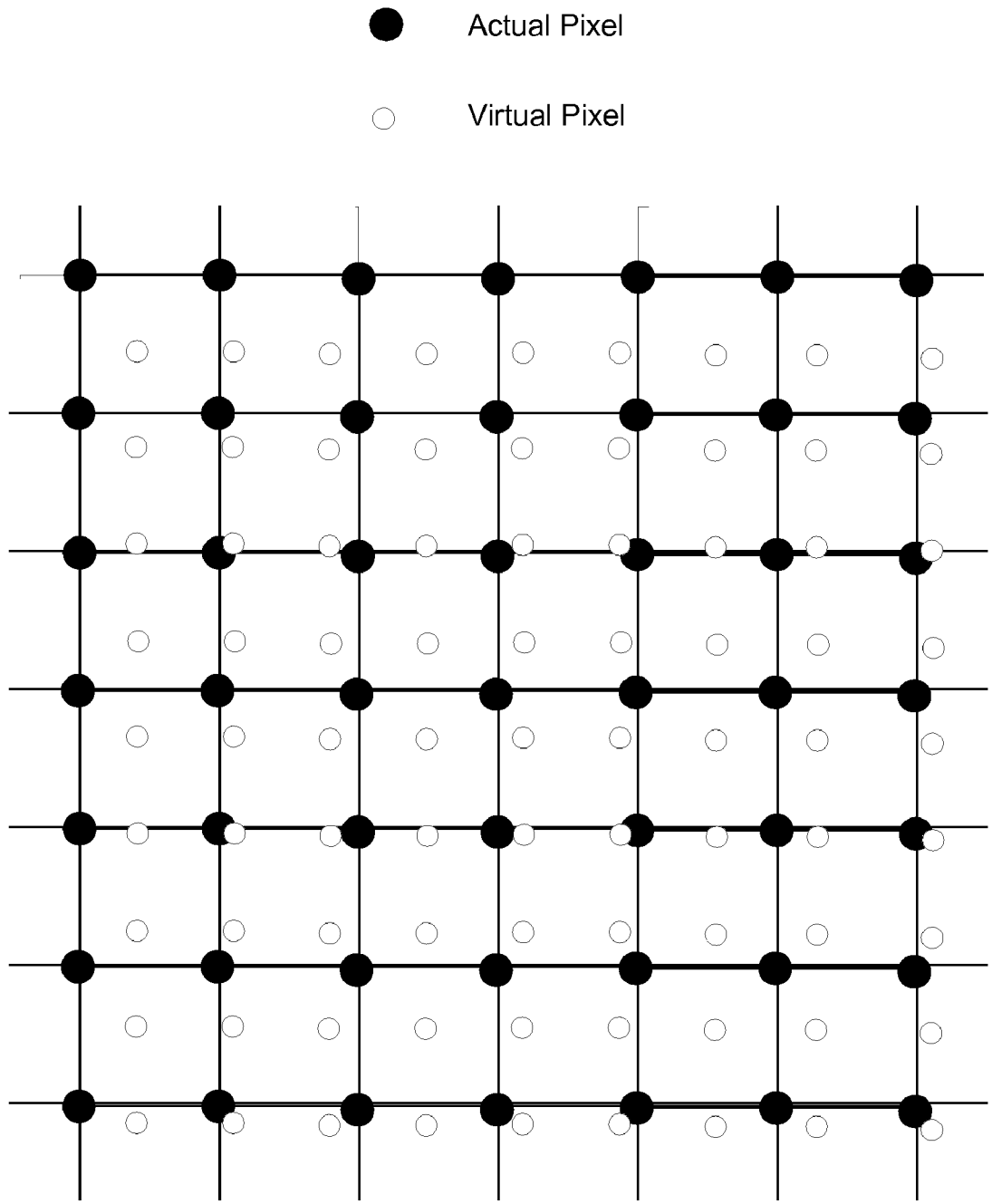
FIG. 2 is a block diagram illustrating a compressed image according to some embodiments of the invention.
Figure 3:
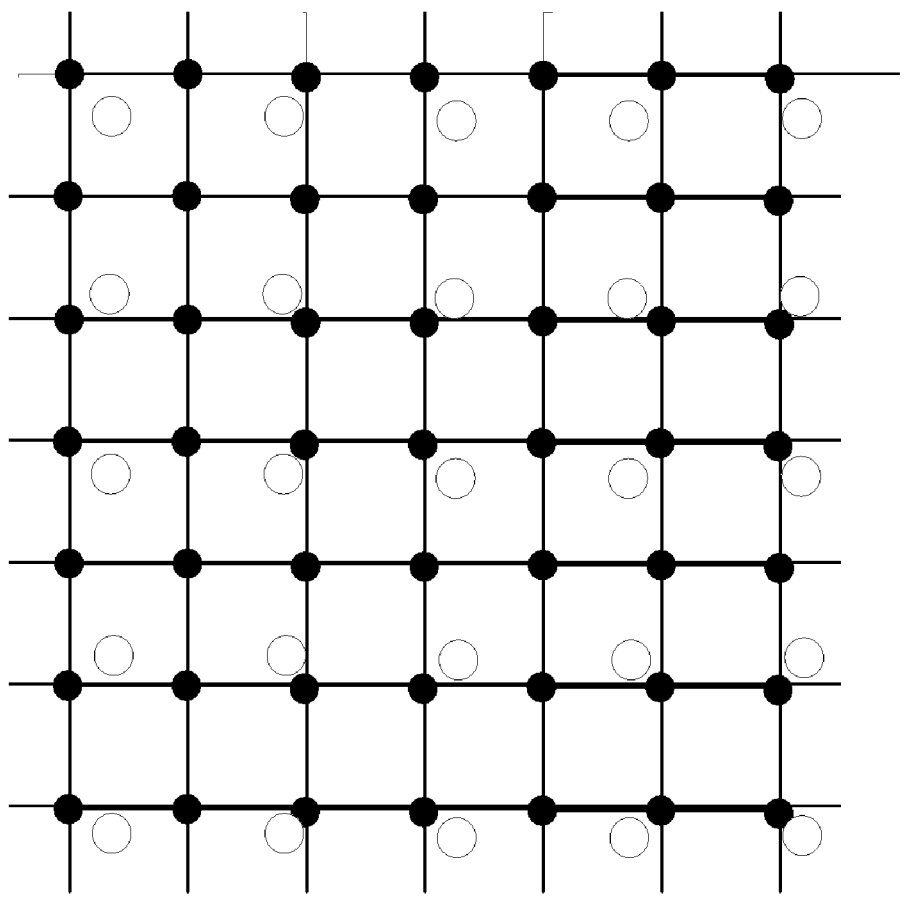
FIG. 3 is a block diagram illustrating an enlarged image according to some embodiments of the invention.

The relationship between the original image and the target image is a linear relationship, i.e., one actual pixel in the target image corresponds to a virtual pixel in the original image. As shown in FIG. 2, the black marks are the actual pixels in the original image and the white marks are the virtual pixels that are projection of the actual pixels from the target image domain to the original image domain. If the original image is scaled down, the virtual pixels are relatively denser and the distance between two virtual pixels is less than the distance between two actual pixels. As shown in FIG. 3, if the image is scaled up, the virtual pixels are relatively looser and the distance between two virtual pixels is greater than the distance between two actual pixels.

Assume that a user sets a scale factor to be n/m (m and n are natural numbers), the coordinates of an actual pixel in the target image are defined as $(x_o, y_o)$ and the coordinates of the corresponding pixel in the original image are defined as $(x_s, y_s)$. The transformation from the domain of the original image to the domain of the target image is defined as follows:

$$x_o = x_s * n/m \quad (1)$$

$$y_o = y_s * n/m \quad (2)$$

Similarly, the inverse transformation from the domain of the target image to the domain of the original image is defined as follows:

$$x_s' = x_o * m/n \quad (3)$$

$$y_s' = y_o * m/n \quad (4)$$

In other words, according to step S100, the coordinates of an actual pixel in the target image $(x_o, y_o)$ correspond to the coordinates of a virtual pixel in the original image $(x_s', y_s')$. For example, if the coordinates of an actual pixel in the target image are (1, 1) and the scale factor is ⅔, the coordinates of the corresponding virtual pixel in the original image are (1.5, 1.5).

According to step S200, the coordinates of the four actual pixels that are closest to the virtual pixel in the original image are determined as follows:

Step S210: The coordinates of the first actual pixel (p, q) are defined by rounding off the coordinates of a virtual pixel in the original image $(x_s', y_s')$, i.e., $p=[x_s']$ and $q=[y_s']$;

Step S220: The coordinates of the second actual pixel (p+1, q) are defined by increasing the x-coordinate of the first actual pixel in the original image by one unit;

Step S230: The coordinates of the third actual pixel (p, q+1) are defined by increasing the y-coordinate of the first actual pixel in the original image by one unit; and Step S230: The coordinates of the fourth actual pixel (p+1, q+1) are defined by increasing both the x-coordinate and y-coordinate of the first actual pixel in the original image by one unit.

For example, if a virtual pixel's coordinates in the original image are (1.5, 1.5), the first actual pixel's coordinates in the original image are (1, 1), the second actual pixel's coordinates in the original image are (2, 1), the third actual pixel's coordinates in the original image are (1, 2), and the fourth actual pixel's coordinates in the original image are (2, 2).

The step S300 of determining the weights of the four actual pixels further includes:

Step S310: Determine respectively the horizontal residual and the vertical residual of each of the first, second, third and fourth actual pixels, wherein the horizontal residual is defined to be the distance from the actual pixel to the next virtual pixel in the horizontal direction and the vertical residual is defined to be the distance from the actual pixel to the next virtual pixel in the vertical direction; and Step S320: Determine the horizontal weight based on the horizontal residual and determine the vertical weight based on the vertical residual.

In some embodiments, the step S310 of determining the horizontal residual in the further includes:

Step S3111: Define the horizontal residual $a_1$ of the first actual pixel in the original image to be zero, wherein the first actual pixel represents all the actual pixels whose x-coordinates are zero;

Step S3112: If the horizontal residual $a_N$ of the $N^{th}$ actual pixel in the original image is greater than or equal to n, the horizontal residual $a_{N+1}$ of the $(N+1)^{th}$ actual pixel is $(a_N-n)$, wherein n is the numerator of the scale factor, and the $N^{th}$ actual pixel represents all actual pixels whose x-coordinates are N; and Step S3113: If the horizontal residual $a_N$ of the $N^{th}$ actual pixel in the original image is less than n, the horizontal residual $a_{N+1}$ of the $(N+1)^{th}$ actual pixel is $(a_N+m-n)$, wherein m is the denominator of the scale factor.

In some embodiments, according to the steps of determining the horizontal residual mentioned above, the horizontal residuals of the actual pixels in the original image are determined so as to form a sequence of horizontal residuals such that the actual pixels that have the same x-coordinates in the original image share the same horizontal residual.

After determining the sequences of horizontal residuals, the step S320 of determining the horizontal weight further includes:

If the horizontal residual $a_N \geq n$, the $N^{th}$ actual pixel is a minor contributory pixel; in some embodiments, a major contributory pixel is defined to be the actual pixel that immediately precedes the virtual pixel and a minor contributory pixel is defined to be the actual pixel that immediately follows the virtual pixel;

If the horizontal residual $a_N < n$, the $N^{th}$ actual pixel is a major contributory pixel and its major horizontal weight is $(n-a_N)$; and If the horizontal residual $a_N < n$, the $(N+1)^{th}$ actual pixel is a minor contributory pixel and its minor horizontal weight is $a_N$.

According to the steps above, it is possible to determine the horizontal weight of an actual pixel if it is deemed to be the major contributory pixel and the horizontal weight of the actual pixel if it is deemed to be the minor contributory pixel, respectively.

In some embodiments, the step S310 of determining the vertical residual further includes:

Step S3121: Define the vertical residual of the first actual pixel in the original image to be zero, wherein the first actual pixel represents all the actual pixels whose y-coordinates are zero;

Step S3122: If the vertical residual $b_N$ of the $N^{th}$ actual pixel in the original image is greater than or equal to n, the vertical residual $b_{N+1}$ of the $(N+1)^{th}$ actual pixel is $(b_N-n)$, wherein n is the numerator of the scale factor, and the $N^{th}$ actual pixel represents all the actual pixels whose y-coordinates are N; and Step S3123: If the vertical residual $b_N$ of the $N^{th}$ actual pixel in the original image is less than n, the vertical residual $b_{N+1}$ of the $(N+1)^{th}$ actual pixel is $(b_N+m-n)$, wherein m is the denominator of the scale factor.

In some embodiments, according to the steps of determining the horizontal residual mentioned above, the horizontal residuals of the actual pixels in the original image are determined so as to form a sequence of horizontal residuals such that the actual pixels that have the same x-coordinates in the original image share the same horizontal residual.

In some embodiments, according to the aforementioned steps of determining the vertical residual, it is possible to determine the vertical residuals of the actual pixels in the original image so as to form a sequence of vertical residuals such that the actual pixels that have the same y-coordinates in the original image share the same vertical residual.

After determining the sequences of vertical residuals, the step S320 of determining the vertical weight further includes:

If the vertical residual $b_N \geq n$, an $N^{th}$ actual pixel is a minor contributory pixel;

If the vertical residual $b_N < n$, the $N^{th}$ actual pixel is a major contributory pixel and its major vertical weight is $(n-b^N)$; and If the vertical residual $b_N < n$, the $(N+1)^{th}$ actual pixel is a minor contributory pixel and its minor vertical weight is $b_N$.

According to the steps above, it is possible to determine the vertical weight of an actual pixel if it is deemed to be the major contributory pixel and the vertical weight of the actual pixel if it is deemed to be the minor contributory pixel, respectively.

In some embodiments, the step S400 of determining the pixel value of the virtual pixel based on the pixel values and weights of the four actual pixels includes:

Step S410: Perform an average of the actual pixel values using the horizontal weights; and Step S420: Perform an average of the actual pixel values using the vertical weights.

During the course of performing the step S410, the first and third actual pixels to the left of the virtual pixel are treated as major contributory pixels and their associated major horizontal weights are used for performing the weighted average. The second and fourth actual pixels to the right of the virtual pixel are treated as minor contributory pixels and their associated minor horizontal weights are used for performing the weighted average.

The step S410 of performing the horizontally weighted average further includes:

Step S411: The pixel value of a first temporary virtual pixel in the original image is determined by summing (i) the pixel value of the first actual pixel, which is treated to be a major contributory pixel, after being weighted in accordance with the first actual pixel's major horizontal weight and (ii) the pixel value of the second actual pixel, which is treated to be a minor contributory pixel, after being weighted in accordance with the second actual pixel's minor horizontal weight; and Step S412: The pixel value of a second temporary virtual pixel in the original image is determined by summing (i) the pixel value of the third actual pixel, which is treated to be a major contributory pixel, after being weighted in accordance with the third actual pixel's major horizontal weight and (ii) the pixel value of the fourth actual pixel, which is treated to be a minor contributory pixel, after being weighted in accordance with the fourth actual pixel's minor horizontal weight.

When performing the step 412, the first and second actual pixels above the virtual pixel are treated as major contributory pixels and their associated major vertical weights are used for performing the weighted average. The third and fourth actual pixels below the virtual pixel are treated as minor contributory pixels and their associated minor vertical weights are used for performing the weighted average.

The pixel value of the first temporary virtual pixel in the original image is determined by summing (i) the pixel value of the first actual pixel, which is treated to be a major contributory pixel, after being weighted in accordance with the first actual pixel's major vertical weight and (ii) the pixel value of the second actual pixel, which is treated to be a major contributory pixel, after being weighted in accordance with the second actual pixel's major horizontal weight.

The pixel value of the second temporary virtual pixel in the original image is determined by summing (i) the pixel value of the third actual pixel, which is treated to be a minor contributory pixel, after being weighted in accordance with the third actual pixel's minor horizontal weight and (ii) the pixel value of the fourth actual pixel, which is treated to be a minor contributory pixel, after being weighted in accordance with the fourth actual pixel's minor horizontal weight.

In some embodiments, the step S420 of performing the vertical weighted average of the pixel values of the first and second temporary virtual pixels further includes: determining the pixel value of the actual pixel in the target image that corresponds to the virtual pixel in the original image by summing the pixel values of the first and second virtual pixels that are weighted respectively by the two pixels' associated vertical weights. The process of determining the pixel values in the target image is repeated row by row and pixel by pixel within each row until the entire target image is generated.

In some embodiments, the numerator n of the scale factor n/m is chosen to be a power of 2 to expedite the target image generation process.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of image scaling, comprising:
   determining the coordinates of a virtual pixel in an original image, wherein the virtual pixel corresponds to an actual pixel in a scaled target image;
   determining the coordinates of four actual pixels in the original image that are closest to the virtual pixel;
   determining the weights of the four actual pixels; and
   determining the pixel value of the virtual pixel in the original image in accordance with the determined weights and the pixel values of the four actual pixels;
   wherein the step of determining the coordinates of four actual pixels in the original image that are closest to the virtual pixel further includes:
      rounding off the coordinates of the virtual pixel in the original image to determine a first actual pixel's coordinates (p, q);
      determining a second actual pixel's coordinates (p+1, q) by increasing the x-coordinate of the first actual pixel by one unit;
      determining a third actual pixel's coordinates (p, q+1) by increasing the y-coordinate of the first actual pixel by one unit; and
      determining a fourth actual pixel's coordinates (p+1, q+1) by increasing both the x-coordinate and y-coordinate of the first actual pixel by one unit.

2. The method of image scaling according to claim 1, wherein the step of determining the coordinates of a virtual pixel in an original image includes scaling the coordinates of the virtual pixel in the original image by a scale factor.

3. The method of image scaling according to any one of claim 2, wherein the scale factor is defined as n/m, both n and m being natural numbers and n being a power of 2.

4. The method of image scaling according to claim 1, wherein the step of determining the weights of the four actual pixels further includes:
   determining respectively a horizontal residual and a vertical residual of each of the first, second, third, and fourth actual pixels;
   determining a horizontal weight in accordance with the horizontal residual of each of the four actual pixels; and
   determining a vertical weight in accordance with the vertical residual of each of the four actual pixels.

5. The method of image scaling according to claim 4, wherein the step of determining the pixel value of the virtual pixel in the original image further includes:
   determining the pixel value of a first temporary virtual pixel by averaging the pixel values of the first actual pixel and the second actual pixel in accordance with their respective horizontal weights;
   determining the pixel value of a second temporary virtual pixel by averaging the pixel values of the third actual pixel and the fourth actual pixel in accordance with their respective horizontal weights; and
   determining the pixel value of the virtual pixel by averaging the pixel values of the first temporary virtual pixel and the second temporary virtual pixel in accordance with the four actual pixel's respective vertical weights.

6. The method of image scaling according to claim 4, wherein the step of determining the horizontal residual of an actual pixel in the original image further includes:
   assigning the horizontal residual $a_1$ of an actual pixel at the coordinate origin of the original image to be zero;
   if the horizontal residual $a_N$ of the $N^{th}$ actual pixel is greater than or equal to n, setting the horizontal residual $a_{N+1}$ of the $(N+1)^{th}$ actual pixel to be $(a_N-n)$; and
   if the horizontal residual $a_N$ of the $N^{th}$ actual pixel is less than n, setting the horizontal residual $a_{N+1}$ of the $(N+1)^{th}$ actual pixel is be $(a_N+m-n)$.

7. The method of image scaling according to claim 6, wherein the step of determining the horizontal weight of an $N^{th}$ actual pixel in the original image further includes:
   if the horizontal residual $a_N \geq n$, defining the $N^{th}$ actual pixel to be a minor contributory pixel;
   if the horizontal residual $a_N < n$, defining the $N^{th}$ actual pixel to be a major contributory pixel and setting its major horizontal weight to be $(n-a_N)$; and
   if the horizontal residual $a_N < n$, defining the $(N+1)^{th}$ actual pixel to be a minor contributory pixel and setting its minor horizontal weight to be $a_N$.

8. The method of image scaling according to claim 7, wherein the step of determining the pixel value of the first temporary virtual pixel further includes:
   weighting the pixel value of the first actual pixel in accordance with the horizontal weight of the first actual pixel's major horizontal contributory pixel;
   weighting the pixel value of the second actual pixel in accordance with the horizontal weight of the second actual pixel's minor horizontal contributory pixel; and
   determining the pixel value of the first temporary virtual pixel in accordance with the weighted pixel values of the first actual pixel and the second actual pixel.

9. The method of image scaling according to claim 8, wherein the step of determining the pixel value of the virtual pixel in the original image further includes:
- weighting the pixel value of the first temporary virtual pixel in accordance with the vertical weight of the first actual pixel's major contributory pixel;
- weighting the pixel value of the second temporary virtual pixel in accordance with the vertical weight of the third actual pixel's minor contributory pixel; and
- determining the pixel value of the virtual pixel in accordance with the weighted pixel values of the first temporary virtual pixel and the second temporary virtual pixel.

10. The method of image scaling according to claim 4, wherein the step of determining the vertical residual of an actual pixel in the original image further includes:
- assigning the vertical residual $b_1$ of an actual pixel at the coordinate origin of the original image to be zero;
- if the vertical residual $b_N$ of the $N^{th}$ actual pixel is greater than or equal to n, setting the vertical residual $b_{N+1}$ of the $(N+1)^{th}$ actual pixel to be $(b_{N+1}-n)$; and
- if the vertical residual $b_N$ of the $N^{th}$ actual pixel is less than n, setting the vertical residual $b_{N+1}$ of the $(N+1)^{th}$ actual pixel to be $(b_N+m-n)$.

11. The method of image scaling according to claim 10, wherein the step of determining the vertical weight of an $N^{th}$ actual pixel in the original image further includes:
- if the vertical residual $b_N \geq n$, defining the $N^{th}$ actual pixel to be a minor contributory pixel;
- if the vertical residual $b_N < n$, defining the $N^{th}$ actual pixel to be a major contributory pixel and setting its major vertical weight to be $(n-b_N)$; and
- if the vertical residual $b_N < n$, defining the $(N+1)^{th}$ actual pixel to be a minor contributory pixel and setting its minor horizontal weight to be $b_N$.

12. The method of image scaling according to claim 11, wherein the step of determining the pixel value of the second temporary virtual pixel further includes:
- weighting the pixel value of the third actual pixel in accordance with the horizontal weight of the third actual pixel's major horizontal contributory pixel;
- weighting the pixel value of the fourth actual pixel in accordance with the horizontal weight of the fourth actual pixel's minor horizontal contributory pixel; and
- determining the pixel value of the second temporary virtual pixel in accordance with the weighted pixel values of the third actual pixel and the fourth actual pixel.

13. The method of image scaling according to claims 8 and 12, wherein the step of determining the pixel value of the virtual pixel in the original image further includes:
- weighting the pixel value of the first temporary virtual pixel in accordance with the vertical weight of the first actual pixel's major contributory pixel;
- weighting the pixel value of the second temporary virtual pixel in accordance with the vertical weight of the third actual pixel's minor contributory pixel; and
- determining the pixel value of the virtual pixel in accordance with the weighted pixel values of the first temporary virtual pixel and the second temporary virtual pixel.

* * * * *